Nov. 23, 1926.    
W. S. ADAMS  
1,607,716
FLUID GAUGE
Filed March 20, 1923
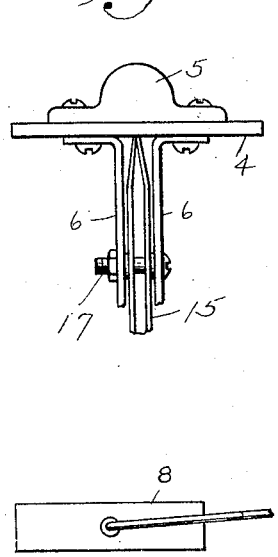
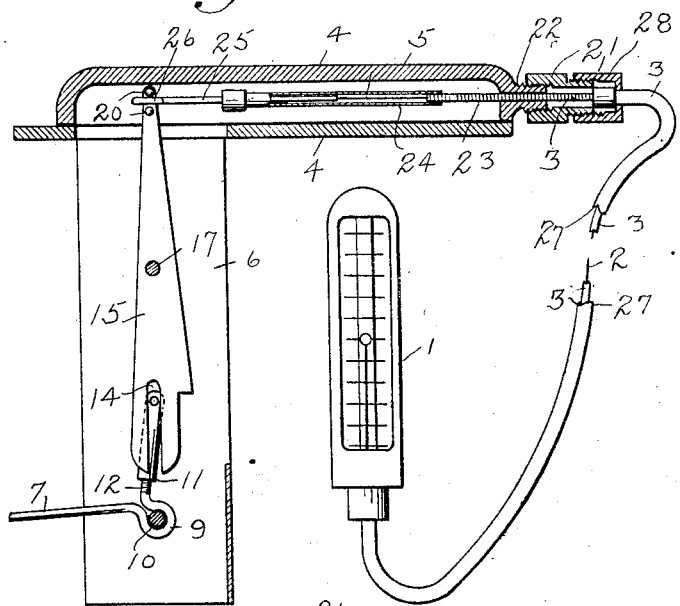
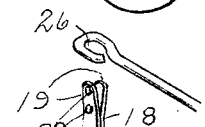
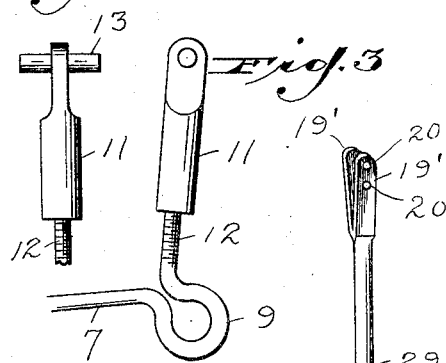
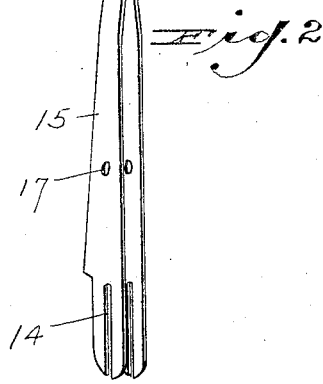
Inventor  
William S. Adams  
By J. L. Walker  
Attorney Patented Nov. 23, 1926.

1,607,716

UNITED STATES PATENT OFFICE.

WILLIAM S. ADAMS, OF SAN DIEGO, CALIFORNIA, ASSIGNOR TO THE GROLAN MANUFACTURING COMPANY, OF DAYTON, OHIO, A CORPORATION OF DELAWARE.

FLUID GAUGE.

Application filed March 20, 1923. Serial No. 626,268.

My invention relates to liquid gauges of the float operated type, wherein the rise and fall of a float within a tank is communicated to a distant indicator by the to and fro movement of an intermediate flexible transmission member, actuated by such float.

The present invention pertains more particularly to the quickly detachable connection between the reciprocatory transmission element and the operating lever of the float unit, by which the tank unit and transmission member may be readily connected and disconnected. The transmission wire or strand of such gauges is quite delicate and subject to distortion or kinks which interfere with its successful operation. For this reason it is quite desirable that the transmission element and indicator head be separated from the tank unit or float controlled actuator during shipment and installation.

To this end the present invention involves an oscillatory actuator arm controlled by the rise and fall of the float which, however, is bifurcated at its operative end, the furcations being flexible and resilient or under tension. These furcations are provided with small projections or bosses on their outer side over which an eye or loop in the end of the reciprocatory transmission element is engaged by flexing the furcations one toward the other, so that the eye or loop is snapped into place, and when once engaged will not readily be disengaged during the normal operation of the apparatus. The construction also involves a feature of adjustment by which the actuating arm of the tank unit may be adjusted or regulated in relation with the fluctuation of the float to afford it proportionately greater or less stroke, thereby enabling the indicator head to be synchronized with the float movement.

The object of the invention is to simplify the structure as well as the means and mode of operation of such float actuating guages, whereby they will not only be cheapened in construction, but will be more efficient in use, positive in operation, uniform in action, durable, and unlikely to get out of repair.

A further object of the invention is to provide a quickly detachable connection between the actuator and the transmission element by which the gauge may be easily and quickly separated into distinct units to facilitate storage, shipment and installation.

A further object of the invention is to provide improved adjusting means for the float controlled actuator by which its operative stroke may be varied in relation with the fluctuations of the float.

With the above primary and other incidental objects in view as will more fully appear in the specification, the invention consists of the features of construction, the parts and combinations thereof, and the mode of operation or their equivalents as hereinafter described and set forth in the claims.

Referring to the drawings, Fig. 1 is a general view of an assembled gauge, the tank of which has been shown partly in section. Fig. 2 is a detail perspective view of the actuator arm and engaging portions of the transmission element removed from the gauge and shown in disconnected relation. Fig. 3 is a side elevation of the adjustable coupling for the actuating lever by which its range of movement in response to fluctuations of the float may be varied. Fig. 4 is a detail view of the adjustable connection shown in Fig. 3. Fig. 5 is a perspective view of a modification of the construction shown in Fig. 1, wherein the actuating arm or lever is positively connected with the float arm in lieu of the compound leverage construction shown in Fig. 1. Fig. 6 is an end view of the tank unit.

Like parts are indicated by similar characters of reference throughout the several views.

In the drawings 1 is an indicator head which may be of any suitable or convenient type to be operated by the longitudinal movement of a transmission element such as a wire, strand or cable which receives its actuating influence from the float within a distantly located tank. In the present instance, this intermediate flexible transmission member 2 is shown enclosed in a flexible guide tube 3, by which it may be operatively conducted through a curvilinear path of travel between the tank and the indicator. At its opposite end the guide tube 3 is connected to the head of a hanger or support mounted upon the fuel tank consisting of a top plate 4 to which is secured a detachable housing 5. Projecting downwardly from the plate 4 is a pair of hanger arms 6, or other suitable support bracket, to which is pivoted a float arm 7. The float arm 7 carries at its free end a buoyant body 8. In the present instance the float arm has been shown of a very economical construction wherein it is bent upon itself to form an eye 9 engaging its pivotal stud 10. Adjustably mounted upon the float arm 7, is a second arm or coupling member 11. This coupling member 11 has screw threaded engagement with the arm 7, whereby it may be extended to greater or lesser degree within a limited range in relation with the center of oscillation 10. In the present instance, the float arm is shown provided with a screw threaded stud 12, engaging in a correspondingly threaded bore in the member 11. At its free end, the member 11 carries a transverse pin 13, which engages in a slot 14 in the actuating lever 15 which is also pivoted to the hanger or support 6 upon a transverse axis 17. The construction affords a compound leverage wherein the rise and fall of the float is transmitted to the actuating lever 15, causing it to be oscillated to and fro about its pivotal connection 17. This actuating lever is preferably, though not necessarily of double formation. As shown in Fig. 2 it is preferably formed from sheet metal to form a channel like body within one end of which channel the connecting member 11 extends. At its opposite end the sides of such channel like member are contracted approximately into contact with each other and then slightly flared outwardly as at 18 to form two resilient fingers. These fingers 19 are embossed or otherwise provided with miniature protuberances 20 in spaced relation and in close proximity to the end of the fingers. The guide tube 3 for the transmission member is fixedly secured to the housing 5 by means of a clamp nut 21 engaging a tubular stem or extension 22 upon the housing 5. The guide tube is provided with an extension 23 projecting within the housing 5 where it is connected to an inflexible tubular extension 24. Within this extension 24 reciprocates the rod or stem 25, to one end of which the flexible transmission strand 2 is engaged. The outer end of such reciprocatory rod or stem is provided with an eye or loop 26, engageable over the flexible fingers 19 of the actuating lever 15. Through the resiliency of the spring fingers 19, the eye or loop 26 is yieldingly held in engaged position, surrounding such flexible fingers and intermediate the external protuberances 20. By flexing the fingers 19, the eye 26 may be readily engaged and disengaged therefrom. The housing 5 being detachably connected to the plate 4, affords easy access to the detachable connection between the transmission member stem 25 and the operating lever. When disconnected the head 5 and indicator 1 with the intermediate guide tube and transmission element may form one unit, for storage and shipment.

The actuator devices mounted upon the tank form a second separable unit. This is a great convenience in transportation and installation. The transmission wire 2 being quite delicate is subject to bends and kinks, which may occur by movement of the tank unit during transportation or during the installation of the instrument if the parts are transported and installed while interconnected. The stem 22 through which the guide tube enters the housing 5, is preferably tapered and longitudinally slotted to afford a series of fingers or tines which are contracted upon the inserted portion of the guide tube 23 by the adjustment of the nut 21. The guide tube 3 is usually though not necessarily provided with an armour or covering 27, intermediate the head 5 and the indicator 1, which armour covering is also preferably clamped or otherwise fixedly secured to the mounting head 5 by means of the clamp nut 28.

By adjusting the coupling member 11 upon its screw threaded connection with the arm 7 it may be extended or retracted in relation with the center of oscillation of the float arm and hence the throw or range of movement of the actuating lever may be varied.

In lieu of the compound lever mechanism disclosed in Fig. 1 the actuating arm may be fixedly connected to the float arm as is shown in Fig. 5. In this construction the float arm 7 is provided with an integral upwardly extending arm 29, bifurcated at its extremity and provided with the external miniature protuberances 20 for engagement with the eye or loop 26 before described. The short extension of the guide tube 23 within the housing 5 by its flexibility compensates for the arcuate path of movement of the connection 26 about the center 17.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is therefore claimed in any of its forms or modifications within the legitimate and valid scope of the appended claims.

Having thus described my invention I claim:

1. In a liquid gauge wherein the rise and fall of a float are communicated to a distantly located indicator by the longitudinal movement of an intermediate transmission element, a float governed actuator including a bifurcated oscillatory lever, the furcations of which are resilient, and a loop in the extremity of the transmission element detachably engageable over the resilient furcations of the lever to positively transmit the fluctuations of the float to the transmission element and thence to the indicator.

2. In a liquid gauge, wherein the rise and fall of a float are communicated to a remotely located indicator by the longitudinal movement of an intermediate transmission element, a float-governed actuator comprising an oscillatory lever with long and short arms, the former carrying the float, a support, a second lever fulcrumed upon the support and consisting of opposed spring pieces, which are secured together for a relatively short distance a small distance from the extremities of certain free ends of said pieces, said extremities being yieldable and spaced apart, the other portions of the pieces below where they are secured together being spaced a substantial distance and having their end portions beyond the fulcrum of the second lever provided with elongated slots, the short arm of the first lever engaging between the lower spaced portions of the second lever and provided with a transverse pin engaging in said slots, whereby the fluctuations of the liquid level may transmit from the first lever to the second lever, said transmission element having a loop at one end engaging over both relatively short yieldable extremities of said opposed pieces, and means spaced on the remote faces of said relatively short yieldable extremities to retain the loop in its necessary position, whereby the movement of the second lever may transmit a longitudinal movement to the transmission element.

In testimony whereof, I have hereunto set my hand this 12th day of March A. D. 1923.

WILLIAM S. ADAMS.